United States Patent
Nember

(10) Patent No.: US 6,988,669 B2
(45) Date of Patent: Jan. 24, 2006

(54) THERMOSTATIC MIXER VALVE ASSEMBLED IN A CARTRIDGE BODY

(75) Inventor: Oscar Nember, Rodengo Saiano (IT)

(73) Assignee: Zipponi Rubinetterie di Nember Oscar, Rodengo Saiano (IT)

( * ) Notice: Subject to any disclaimer, the term of this patent is extended or adjusted under 35 U.S.C. 154(b) by 289 days.

(21) Appl. No.: 10/400,847

(22) Filed: Mar. 27, 2003

(65) Prior Publication Data

US 2004/0089728 A1 May 13, 2004

(30) Foreign Application Priority Data

Nov. 7, 2002 (IT) .................... BS2002U0118

(51) Int. Cl.
*G05D 23/12* (2006.01)

(52) U.S. Cl. .................................... 236/12.2
(58) Field of Classification Search ............ 236/12.2
See application file for complete search history.

(56) References Cited

U.S. PATENT DOCUMENTS

| | | | | |
|---|---|---|---|---|
| 3,827,016 A | * | 7/1974 | Knapp | 236/12.2 |
| 4,029,256 A | * | 6/1977 | Dauga | 236/12.2 |
| 4,760,953 A | * | 8/1988 | Trubert | 236/12.2 |
| 5,340,018 A | * | 8/1994 | MacDonald | 236/12.2 |
| 5,931,374 A | * | 8/1999 | Knapp | 236/12.2 |
| 6,279,831 B1 | * | 8/2001 | Lorch | 236/12.13 |
| 6,325,295 B1 | * | 12/2001 | Lorch | 236/12.2 |
| 6,364,210 B1 | * | 4/2002 | Lorch | 236/12.2 |
| 6,454,175 B1 | * | 9/2002 | Lorch | 236/12.2 |

* cited by examiner

*Primary Examiner*—William E. Tapolcai
(74) *Attorney, Agent, or Firm*—McGlew and Tuttle, P.C.

(57) ABSTRACT

The invention concerns a thermostatic mixer valve for hot and cold water, which comprises a rotary delivery regulator device (15), a thermostatic bulb (17) positioned coaxially to said regulator device, and a mixer control device (16) working in conjunction with the thermostatic bulb. The delivery regulator device (15) and the mixer control device (16) with relative thermostatic bulb (17) are assembled and housed ready to operate in a cartridge body (10) inserted as a whole in a tap body which has means of transporting hot and cold water towards a mixer chamber and means of delivering the water towards the user point.

20 Claims, 4 Drawing Sheets

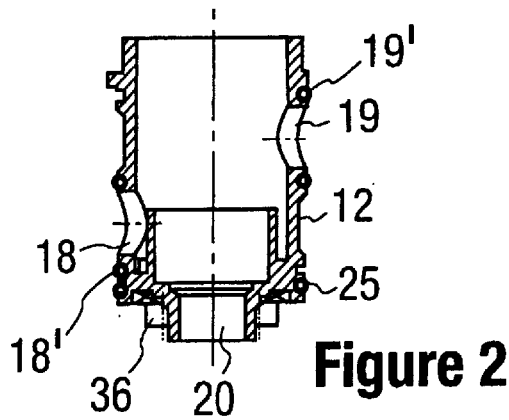
Figure 2
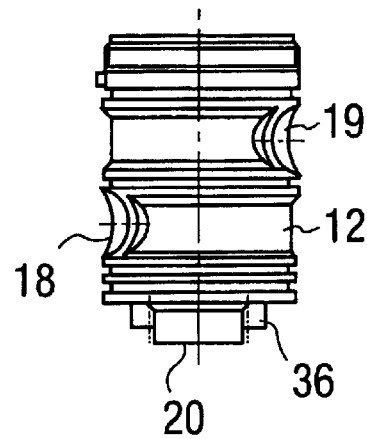
Figure 3
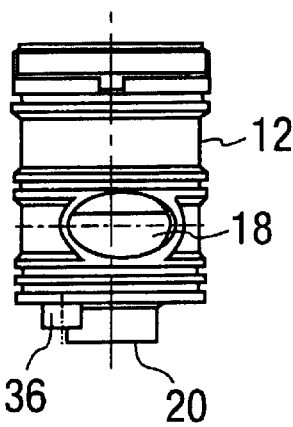
Figure 4
Figure 5
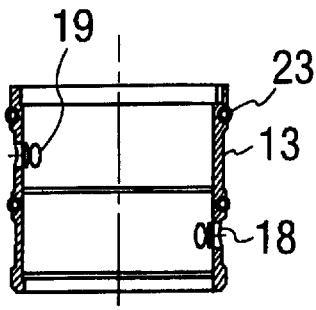
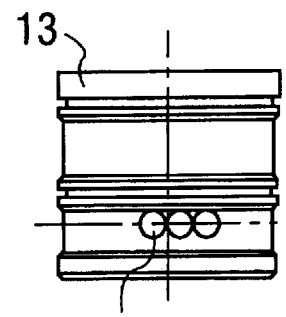
Figure 6
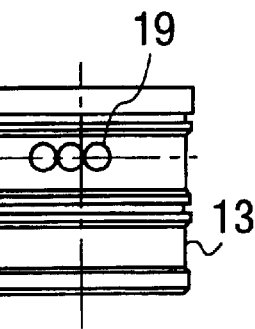
Figure 6a

THERMOSTATIC MIXER VALVE ASSEMBLED IN A CARTRIDGE BODY

FIELD OF THE INVENTION

This invention concerns the field of the taps in general and refers in particular to hot and cold mixer valves with a thermostatic unit.

PRIOR ART

Various solutions for hot and cold mixer valves for sanitation and water services including mixer valves with associated a thermostat unit to automatically control the temperature of the mixed water delivered are already well known.

A mixer valve of the type presented here is made up of components combining with each other and assembled in a body which is the same body as the tap in which it is operating. To be more specific, said mixer valve includes, inside a tap body, a rotary delivery regulator device, a thermostatic bulb coaxial to the regulator device and a mixer unit which can move axially relative to the delivery regulator device in response to the dilation of the thermostatic bulb it works in association with. The tap body has two lateral holes for separate input of hot and cold water leading to a mixer chamber which houses the thermostatic bulb with mixer device and which is connected to an output passageway of the mixed water to be delivered for use. The delivery regulator unit and the mixer element are controlled separately; the mixer chamber is positioned between the regulator unit and the bottom of the tap body; the output passageway of the mixed water is at the bottom of the body; the regulator unit has two openings on a level with the mixer chamber, each working in conjunction with one of the input hot and cold water holes, and which can be positioned either far from or in total or partial coincidence with said holes for selective opening and closing of the valve; and around each opening of the delivery regulator unit there is a seal on the internal surface of the external body.

This well-known production, even if functional, has however the drawback of having to assemble the components of the mixer valve directly in the tap body with the necessity of having to machine and configure this body in order to be able to correctly receive these components.

OBJECTIVES AND SUMMARY OF THE INVENTION

The objective of this invention on the other hand is to put forward and supply a hot and cold water mixer valve complete with pre-assembled thermostat housed in its own body in the form of a cartridge and which can consequently be inserted as a whole in a tap body. The advantages of this solution are that the tap body does not require specific machining, the thermostatic mixer valve is pre-assembled and can be assembled and disassembled in the tap body facilitating replacement and not least, the possibility of also creating a thermostatic mixer valve which can be used in substitution for those more commonly used mixer valves employed in taps for showers or bathtubs.

This objective and these advantages have been achieved in a thermostatic valve according to at least claim 1.

BRIEF DESCRIPTION OF THE DRAWINGS

Greater detail of the invention will become clear from the continuation of the description made with reference to the enclosed indicative and non-limiting drawings, in which:

FIG. 2 shows a section of the cup housing of the cartridge body of the mixer valve;

FIGS. 3 and 4 are two side views of the cup housing in FIG. 2;

FIGS. 5, 6 and 6a show a cross-section view and two views from opposite sides of the external jacket working in conjunction with the cup housing;

DETAILED DESCRIPTION OF THE INVENTION

As shown, the operating components of the thermostatic mixer valve under examination are assembled and held in a cartridge body 10 inserted as a whole in a tap body 11.

Figure 1:
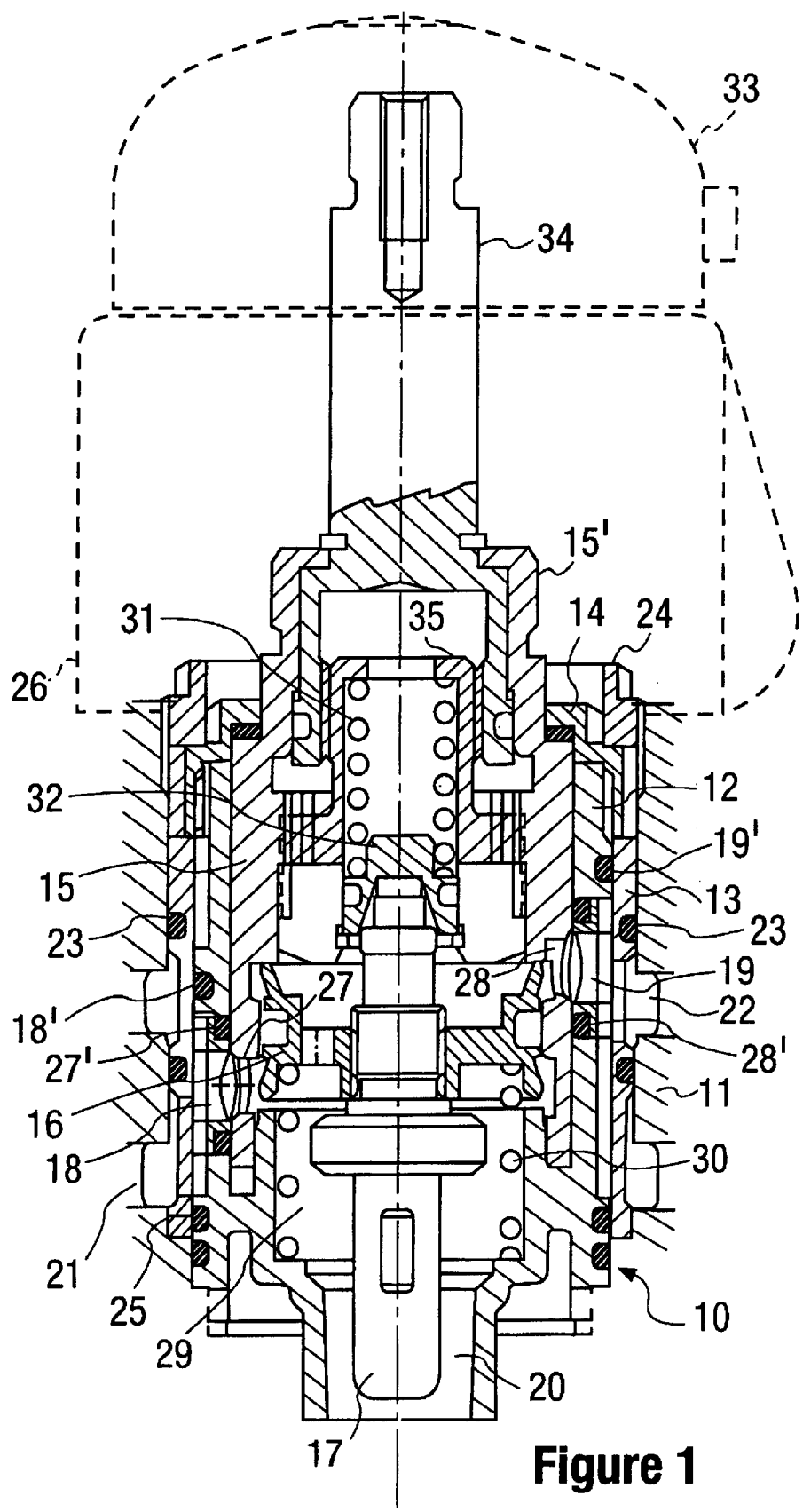
FIG. 1 shows an enlarged cross-section of a first execution of the cartridge mixer valve in a tap body.

According to the product in FIGS. 1–6, the cartridge body 10 is made up of a cup housing 12 working in conjunction with an external jacket 13 and a top ring nut 14. The components of the mixer valve consist basically in a rotary device 15 to regulate the delivery of the water, and a mixer element 16 to control the temperature of the mixed water delivered. This mixer device 16 is working in conjunction with a thermostatic bulb 17, which can move axially in response to the variations in temperature the thermostatic bulb is subjected to, and is positioned with the latter on an axis with the delivery regulator device 15.

The cup housing 12, and in the same way the external jacket 13, have laterally, at different levels, two separate adduction slots 18, 19 respectively for hot and cold water, and a base with a passageway 20 for the water to flow out to be delivered. The hot and cold water reach the adduction slots or parts 18, 19 through respective ducts 21, 22 machined in the tap body 11.

The cup housing 12 and the external jacket 13 are constrained by means of a ring nut 14. Between the cup housing and the external jacket, there is a seal 18', 19' placed respectively around each side slot 18, 19. Around the external jacket 13 and at various levels depending on the position of the adduction slots 18,19 and the ducts 21, 22 for water delivery, there are radial seals 23 on the internal surfaces of the tap body 11 in which the mixer valve is inserted and blocked by a locking ring nut 24. At least one further anti-leak seal 25 is also positioned at the bottom part of the housing 12.

The delivery regulator device 15 is assembled and turns in the cup housing 12 where it is held axially by the ring nut 14 and from where it protrudes in a top neck 15'. In order to turn, it is fitted with a knob 26 which fits onto said top neck 15'. Furthermore, it has two side openings 27, 28 positioned, respectively at the same level as the adduction slots or parts 18, 19 of said housing 12. In this way, by turning the device 15, its openings 27, 28 may be moved away from or to correspond partially or totally with the adduction slots 18, 19 to achieve variable or total opening/closing of the hot and cold water flow into the valve. The adduction slots or parts 18, 19 and/or the openings 27, 28 are not diametrally opposite, but form between them, with respect to the rotation axis of the regulator device, an angle of less than 180°, preferably between 120 and 160° so that in order to open/close the valve the regulator device 15 has only to turn very slightly. There is a seal 27', 28' around each opening 27, 28 of the delivery regulator device 15, preferably assembled and held in position in a housing provided in the cup housing 12.

The delivery regulator device 15 is drilled and forms with the bottom of the housing 12 a mixing chamber 29 which communicates laterally with the entrance openings 27, 28 and at the bottom with the exit passageway 20.

The mixer device 16' is positioned in said chamber on a level with the entrance openings 27, 28 and moves axially with respect to them by means of the thermostatic bulb 17. This bulb is in contact with and is influenced by the temperature of the water flowing in the mixer chamber and, by dilating differently depending on the temperature of the water, causes the mixer device to move so as to close/open as a result openings 27, 28 of the hot and cold water delivery and correspondingly the quantities of the two different types of mixed water so as to maintain the temperature of the water delivered constant.

The movements of the regulator device 16 are contrasted, as is known, by two different opposing springs 30, 31 respectively working in conjunction with the device itself and with a hood 32 resting on the summit of the thermostatic bulb 17.

The temperature of the mixed water can be set as required by using a second knob 33 fixed to a turning shaft 34 working in conjunction with the thermostatic bulb 17 by means of a sliding device 35 which engages spring 31 and, by means of the latter, the hood over the bulb itself.

The thermostatic mixer valve set up in the form of a cartridge as described above can be inserted into a housing provided in the body of any tap 11, blocking it in position simply by tightening ring nut 24. For correct positioning of the mixer valve in the tap body, the housing 12 containing the operating components can be provided with reference lugs 36.

The thermostatic mixer valve, given the operating components and their combination and disposition inside the cartridge body, can also be set up to be used, in a tap body 41 with water inputs and outputs from the bottom, as replacements for the standard mixer valves without thermostats.

Figure 7:
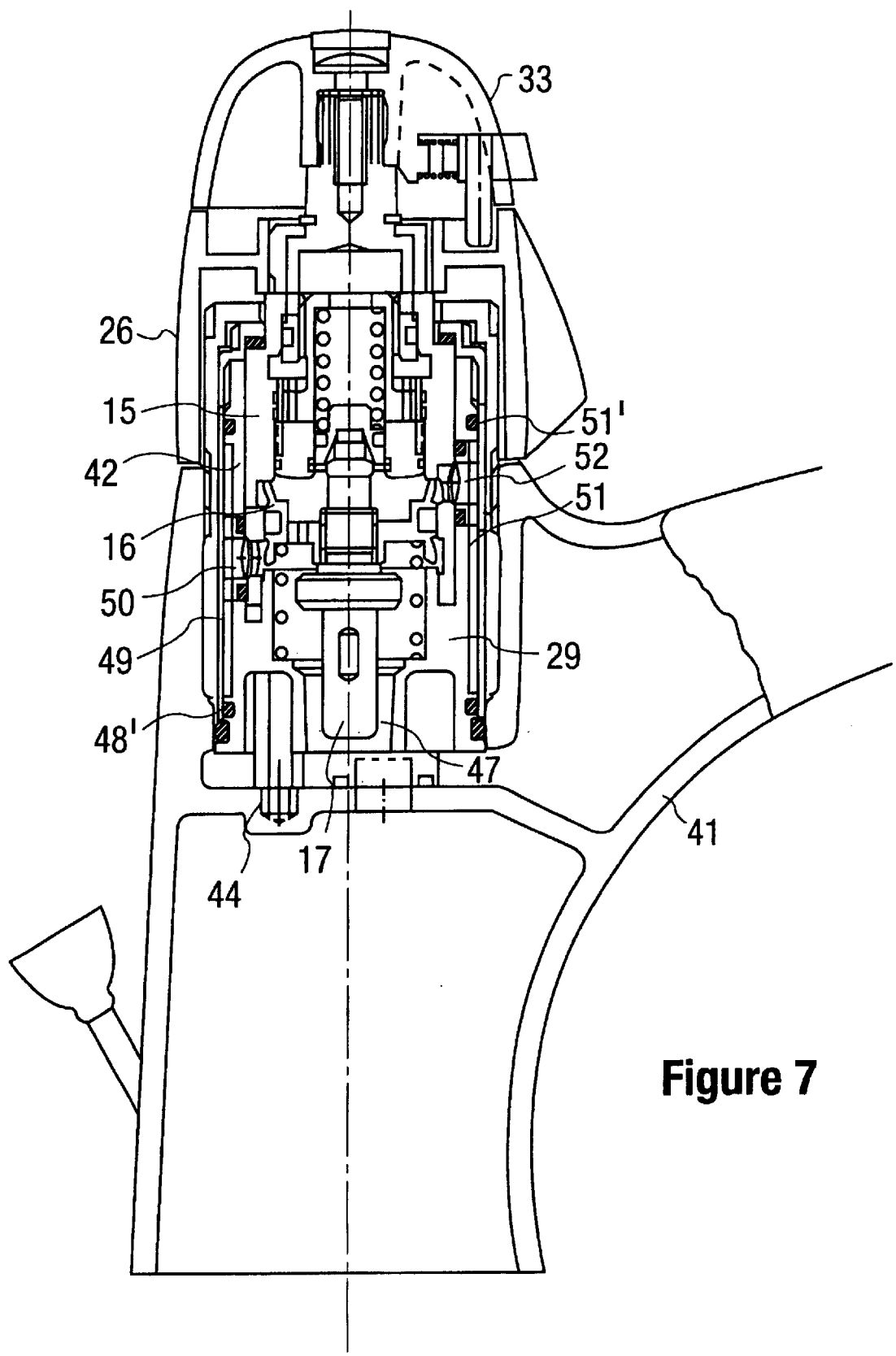
FIG. 7 shows an enlarged cross-section of a construction variation of the cartridge mixer valve in a tap body.
Figure 8:
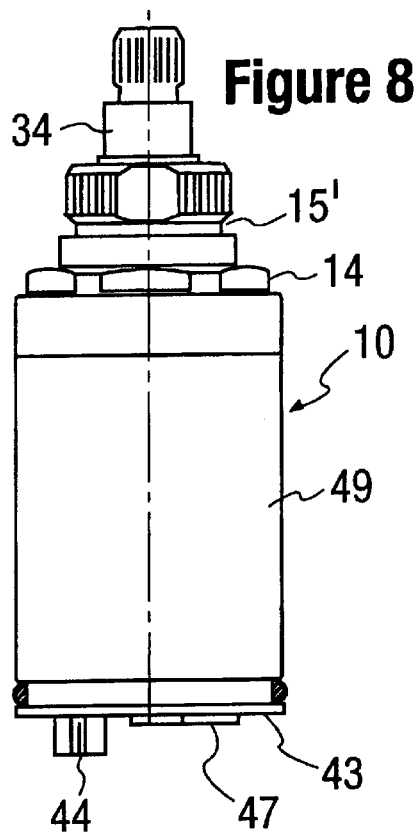
FIG. 8 shows an external view of the mixer valve in FIG. 7.
Figure 9:
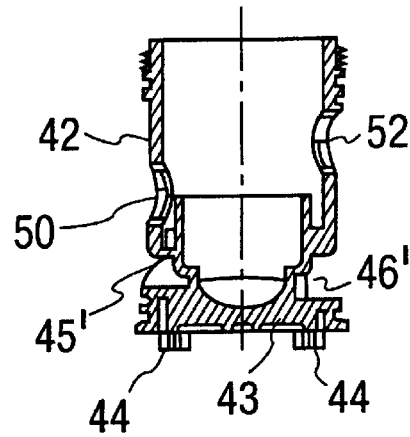
FIG. 9 shows a section of the cup housing of the cartridge body of the mixer valve in FIG. 7.
Figure 10:
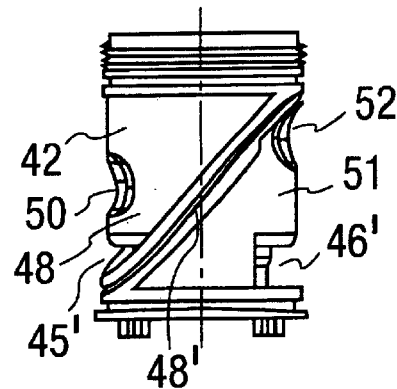
FIGS. 10 and 11 are two side views of the cup housing in FIG. 9.
Figure 11:
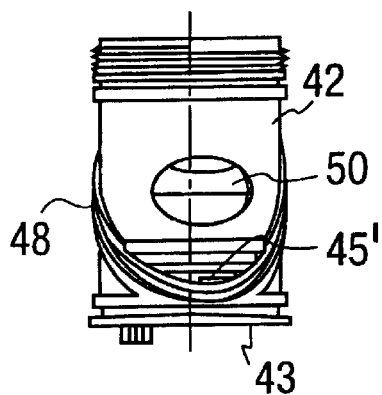
Figure 12:
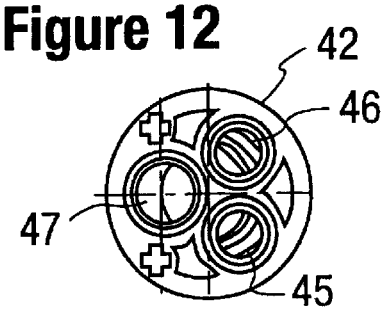
FIG. 12 is a view from the bottom of the cup housing in FIG. 9.

This further mixer valve set up is shown in FIGS. 7–12 where the same reference numbers to indicate the same or equivalent parts have been used. In this set up, the cup housing 42 is integral or working in conjunction with a bottom adaptor 43 having two reference lugs 44, a first inlet passageway for the hot water 45, a second inlet passageway for cold water 46 and an output passageway for mixed water 47. The passageway for hot water 45 is in communication with a first lateral hole 45' with a first duct 48 with a first lateral slot 50 for hot water input into the mixer chamber. In the same way the cold water passageway 46 is in communication with a second lateral hole 46' with a second duct 51 with a second lateral slot 52 for cold water input into the mixer chamber. The two ducts 48, 51 are formed by a seal 48' placed diagonally on the outside of the housing and acting on the internal surface of the external jacket 49. In this way the hot water and the cold water arriving separately from the bottom, flow up through the respective ducts 48, 51 until they enter the valve through their corresponding lateral slots 50, 52. After mixing inside the valve, the mixed water is delivered at a preset temperature towards the point of use flowing through the output passageway at the bottom 47.

What is claimed is:

1. A thermostatic mixer valve for hot and cold water, comprising:
    a rotary delivery regulator device;
    a thermostatic bulb plated coaxially to said regulator device;
    a mixer control device associated with said thermostatic bulb and movable axially in relation to said delivery regulator device in response to a position of said thermostatic bulb, wherein said mixer control device and said thermostatic bulb associated are in a mixing chamber which communicates with a separate hot and a separate cold water adduction passageways and with an output mixed water passageway to a user source, and said delivery regulator device and said mixer control device are controlled separately, and said delivery regulator device and said mixer control device with relative thermostatic bulb are assembled and operative in a cartridge body to be inserted as a whole in a tap body having a means of delivering hot and cold water to said mixing chamber and a means of delivering the water towards an end user, wherein said delivery regulator device and a cup housing together define said mixing chamber and said cup housing and an external jacket together define a lateral hot and a cold water adduction passageways to said mixing chamber under a control of said rotary delivery regulator device, said delivery regulator device having a set of lateral openings which can be positioned away from or in total or partial coincidence with said hot and cold water adduction passageways, and said output passageway of the water towards an end user being at a bottom of said cup housing.

2. The thermostatic mixer valve according to claim 1, wherein said cartridge body is made up of said cup housing associated with said external jacket and a top ring nut, and where said delivery regulator device and said mixer control device together with said thermostatic bulb are housed in said cup housing fixed axially between said top ring nut and a part of the bottom of said cup housing.

3. Mixer valve according to claim 1, wherein said cup housing (42) forms with said delivery regulator device the mixer chamber and has a bottom adaptor (43) with two reference lugs (44), a first hot water input passageway (45), a second cold water input passageway (46) and a mixed water output passageway (47), and where said hot water passageway (45) is in communication, by means of a first lateral hole (45') provided in the wall of the cup housing, with a first duct (48) which is formed by the external jacket (49) together with the cup housing (42) and which leads upwards as far as a first lateral hot water adduction slot (50) to the mixer chamber, and said cold water passageway (46) is in communication, by means of a second lateral hole (46') provided in the cup housing, with a second duct (51) which is formed by the external jacket (49) together with the cup housing (42) and which leads upwards as far as a second lateral cold water adduction slot (52) to the mixer chamber.

4. The thermostatic mixer valve according to claim 1, where said passageways formed by said cup housing and said external jacket to deliver the hot and cold water to said mixing chamber are enclosed by seals and between said cup housing and said external jacket and around said external jacket further seals are assembled.

5. The thermostatic mixer valve according to claim 1, where said inlet passageways of the water into said mixing chamber are at different heights and at an angle between each of said inlet passageways of less than 180°.

6. Mixer valve according to claim 2, wherein said cup housing (42) forms with said delivery regulator device the mixer chamber and has a bottom adaptor (43) with two reference lugs (44), a first hot water input passageway (45), a second cold water input passageway (46) and a mixed water output passageway (47), and where said hot water passageway (45) is in commutation, by means of a first lateral hole (45') provided in the wall of the said cup housing, with a first duct (48) which is formed by the external jacket (49) together with the said cup housing (42) and which leads upwards as far as a first lateral hot water adduction slot (50) to the mixer chamber, and said cold water passageway (46) is in communication, by means of a second lateral hole (46') provided in the cup housing, with a second duct (51) which is formed by the external jacket (49) together with the cup housing (42) and which leads upwards as far as a second lateral cold water adduction slot (52) to the mixer chamber.

7. The thermostatic mixer valve according to claim 2, where said passageways formed by said cup housing and said external jacket to deliver the hot and cold water to said mixing chamber are enclosed by seals and between said cup housing and said external jacket and around said external jacket further seals are assembled.

8. The thermostatic mixer valve according to claim 1, where said passageways formed by said cup housing and said external jacket to deliver the hot and cold water to said mixing chamber are enclosed by seals and between said cup housing and said external jacket and around said external jacket further seals are assembled.

9. Mixer valve according to claim 3, where the passageways formed by the cup housing and the external jacket to deliver the hot and cold water to the mixer chamber are enclosed by seals and between the cup housing and the external jacket and around said external jacket further seals are assembled.

10. The thermostatic mixer valve according to claim 2, where said inlet passageways of the water into said mixing chamber are at different heights and at an angle between said inlet passageways of less than 180°.

11. Mixer valve according to claim 1, where the inlet passageways of the water into the mixer chamber are at different heights and at an angle between them of less than 180°.

12. Mixer valve according to claim 3, where the inlet passageways of the water into the mixer chamber are at different heights and at an angle between them of less than 180°.

13. The thermostatic mixer valve according to claim 4, where said inlet passageways of the water into said mixing chamber are at different heights and at an angle between said inlet passageways of less than 180°.

14. A thermostatic mixer valve for hot and cold water, comprising:
   a regulator drive with a substantially tubular shape along a vertical axis, said regulator drive having a hot water lateral opening and a cold water lateral opening;
   a hot water and a cold water passageways, each said passageway interacting with an outer perimeter of said respective lateral opening;
   a flow-regulating actuator means attached to said regulator drive to rotate said regulator drive about said vertical axis wherein said rotating means causes at least one lateral opening to come into a position of complete alignment, partially alignment, or non-alignment with each said passageway;
   a mixing chamber formed under a lower portion of said regulator drive;
   a thermostatic bulb in said mixing chamber, wherein said thermostatic bulb dilates along said vertical axis depending on a temperature of water in said mixing chamber;
   a mixer control device movable in relation to said thermostatic bulb, said mixer control device including a hot water abutment and a cold water abutment, each of said water abutment interacting with respective inner perimeter of said lateral opening;
   a temperature regulating actuator means for actuating said mixer control device, wherein at least one of said temperature regulating actuator means and said thermostatic bulb actuates said mixer control device to regulate amount of a hot water flow and a cold water flow coming through said lateral opening and into said mixing chamber by causing each said abutment to come into a position of alignment, partially alignment, or non-alignment with each said lateral opening;
   an exit passageway forming a path from said mixing chamber to a user, wherein said thermostatic mixer valve is operably assembled in a cartridge body and inserted as a whole into a tap body.

15. The thermostatic mixer valve according to claim 14, wherein said cup housing forms together with said delivery regulator device said mixing chamber and defines in combination with said external jacket lateral hot and cold water adduction passageways to said mixing chamber under a control of said rotary delivery regulator device, said regulator device having a set of lateral openings which are positioned away from or in total or partial coincidence with said hot and cold water adduction passageways, said output passageway of the water towards said end user being at a bottom of said cup housing.

16. The thermostatic mixer valve according to claim 14, wherein said cartridge body is made up of a cup housing associated with an external jacket and a top ring nut, and wherein said delivery regulator device and said mixer control device together with said thermostatic bulb are housed in said cup housing fixed axially between said top ring nut and a bottom part of said cup housing.

17. The thermostatic mixer valve according to claim 14, where an additional set of passageways formed by a cup housing and an external jacket to deliver the hot and cold water to said mixing chamber are enclosed by seals and between said cup housing and said external jacket and around said external jacket further seals are assembled.

18. The thermostatic mixer valve according to claim 14, wherein said passageways into said mixing chamber are different heights and at an angle between each of said passageways of less than 180°.

19. A thermostatic mixer valve for hot and cold water, formed by the process of:
   providing a regulator drive with a substantially tubular shape along a vertical axis, said regulator drive having a hot water lateral opening and a cold water lateral opening;
   providing a hot water and a cold water passageways, each said passageway interacting with an outer perimeter of said respective lateral opening;
   providing a flow-regulating actuator means attached to said regulator drive to rotate said regulator drive about said vertical axis wherein said rotating means causes at least one lateral opening to come into a position of complete alignment, partially alignment, or non-alignment with each said passageway;
   providing a mixing chamber formed under a lower portion of said regulator drive;
   providing a thermostatic bulb in said mixing chamber, wherein said thermostatic bulb dilates along said vertical axis depending on a mixed water temperature in said mixing chamber;

providing a mixer control device movable in relation to said thermostatic bulb, said mixer control device including a hot water abutment and a cold water abutment, each of said water abutment interacting with inner perimeter of said respective lateral opening;

providing a temperature regulating actuator means for actuating said mixer control device, wherein at least one of said temperature regulating actuator means and said thermostatic bulb actuates said mixer control device to regulate amount of a hot water flow and a cold water flow coming through said respective lateral opening and into said mixing chamber by causing each said abutment to come into a position of alignment, partially alignment, or non-alignment with each said lateral opening;

providing an exit passageway forming a path from said mixing chamber to a user, wherein said thermostatic mixer valve is operably assembled in a cartridge body and inserted as a whole into a tap body.

20. The thermostatic mixer valve according to claim 19, wherein said cup housing forms together with said delivery regulator device said mixing chamber and defines in combination with said external jacket lateral hot and cold water adduction passageways to said mixing chamber under a control of said rotary delivery regulator device, said regulator device having a set of lateral openings which are positioned away from or in total or partial coincidence with said hot and cold water adduction passageways, said output passageway of the water towards said end user being at a bottom of said cup housing.

* * * * *